United States Patent [19]
Eaton et al.

[11] Patent Number: 6,003,802
[45] Date of Patent: Dec. 21, 1999

[54] TAPE LEADER PIN ASSEMBLY AND METHOD FOR MAKING THE SAME

[75] Inventors: James Eaton, Morgan Hill; Thomas R. Albrecht, San Jose; Robert R. Heinze, San Clemente; John A. Hamming, Laguna Niguel, all of Calif.; Jeffrey S. McAllister, Boise, Id.; Thomas W. von Alten, Boise, Id.; Carl R. Hoerger, Boise, Id.; Geoffrey W. Mansbridge, Boise, Id.

[73] Assignees: Seagate Technology, Inc., Scotts Valley; Hewlett-Packard Company, Palo Alto, both of Calif.; International Business Machines Corporation, Armonk, N.Y.

[21] Appl. No.: 09/055,016
[22] Filed: Apr. 3, 1998
[51] Int. Cl.⁶ .............................. G11B 15/66; G03B 1/56
[52] U.S. Cl. ......................... 242/332.4; 226/92; 360/137
[58] Field of Search .............................. 242/332.4, 348.2; 226/92; 360/95, 137

[56] References Cited

U.S. PATENT DOCUMENTS

| | | | |
|---|---|---|---|
| 1,322,966 | 11/1919 | Sinclair | 242/588.1 |
| 4,027,832 | 6/1977 | Lopata | 242/348.2 |
| 4,364,529 | 12/1982 | Barto, Jr. et al. | 226/92 X |

*Primary Examiner*—John Q. Nguyen
*Attorney, Agent, or Firm*—Ladas & Parry

[57] ABSTRACT

A leader pin assembly for attachment to tape as a generic and space-efficient interface between tape and equipment which manipulates the tape, and a method for making the same. The leader pin assembly preferably includes a leader pin, an elastomer element, and a clip. The leader pin is barbell-shaped, having enlarged ends and at least one pair of flanges each spaced a distance from a respective enlarged end to define a pair of recesses and a center section of the leader pin. The center section of the leader pin is sized to permit tape to be wound around the center section, with the elastomer element surrounding the tape and with the clip snugly surrounding the elastomer element to keep the tape securely in place around the center section of the leader pin. The end surfaces of the leader pin may have an outward curve to ensure smooth movement across equipment surfaces during leader pin assembly manipulation. Also the edges of the leader pin may be radiused.

34 Claims, 9 Drawing Sheets

TAPE LEADER PIN ASSEMBLY AND METHOD FOR MAKING THE SAME

FIELD OF THE INVENTION

This invention relates to the field of tape and tape equipment, and, more particularly, to mechanical elements and assemblies for connecting tape to tape drive equipment, such as those used in magnetic tape storage systems employed in computer systems, audio/visual systems, and the like.

BACKGROUND

Several systems and methods exist for winding various types of tape. In computer and audio/visual systems, data storage systems are provided to read data from and/or write data to data storage media, such as magnetic tape. The data storage systems utilizing magnetic tape data storage media typically contain sophisticated data processing equipment and mechanical assemblies which usually include a drive unit for winding the tape. Current tape winding systems use one or more spindles around which tape is wound. To move tape in such systems, a drive unit turns a first spindle in a first direction, thereby winding the tape from a second spindle onto the first spindle. By using the drive unit to turn the second spindle in an opposite direction, the tape may be wound from the first spindle to the second spindle. For portability and tape storage purposes, it is often desirable to remove the tape from the system (hereinafter the "machine") which reads from and/or writes to the tape. Typically, the tape may either be housed entirely within a cassette which has at least two spindles (the tape being attached at each end to a separate spindle) or within a cartridge which has one spindle to which one end of the tape is attached.

In the latter design, the second end of the tape may be removed from the cartridge and drawn inside the machine which reads from and/or writes to the tape. Inside the machine, the second end of the tape is wound around a second spindle. When desired, the tape may be wound back inside the spindle within the cartridge and the cartridge may then be removed from the machine.

The latter (single-spindle) cartridge design has a significant advantage over cartridge designs employing two or more spindles. Specifically, cartridges having only one spindle are much more space efficient. For example, if the cartridge is square-shaped, tape wound within the single-spindle cartridge employs significantly more space within the cartridge than tape wound within multiple-spindle cartridges, where a great amount of cartridge space is left unused. However, since one end of tape within a single-spindle cartridge is commonly removed from the cartridge, drawn into the machine reading from or writing to the tape, and wound around a spindle within the machine, problems arise in the design of an element or assembly which permits the machine to "grab" or "pick" and manipulate the tape end. A number of designs are well-known in the industry, but each brings with it one or more deficiencies. Each design performs the same basic function (i.e., provides an element or assembly to which a machine may attach in order to grab or "pick" the tape end from the cartridge, thereby allowing the machine to pull the tape end inside of the machine and secure the tape end to a spindle within the machine). For purposes of this discussion, the machine mechanism which "picks" the tape end from the cartridge will hereinafter be called the "picker".

In one cartridge design, the tape end to be drawn inside the machine is secured to an element called a leader block. One example of this cartridge design is a cartridge made by IBM and designated model number 3480. When this cartridge is not being used, the leader block forms part of the cartridge wall itself (e.g., part of a perimeter wall or a corner of the cartridge). When installed within the machine which will read from or write to the cartridge tape, the machine inserts a picker into a hole within the leader block. The picker then pulls the leader block into the machine from its position on the cartridge. The tape is secured to the leader block by being wrapped about a pin which is snap fitted into a groove within the leader block. The pin is usually made of an elastomeric material which is slightly larger than the groove into which it fits so that the tape is firmly secured between the pin and the groove when the pin is snapped into place within the groove. The leader block shape of this cartridge design is also important in that once the leader block is fully drawn into the machine, one edge of the leader block forms an exterior surface of the spindle within the machine. Therefore, this leader block edge is curved to match the round exterior shape of the spindle.

A significant disadvantage of the leader block design is its size and shape. For a machine to read from or write to tape stored within a cartridge using a leader block tape connection, the machine must have a picker which is compatible with the rather unusual design, size, and shape of the leader block. Specifically, the picker must fit within the hole in the leader block, while the internal mechanism of the machine must be adapted to accept and secure the leader block (and its particular shape) within the machine. For the above-described leader block design, this means that the machine spindle must be designed to integrally house the leader block. These constraints dictate a relatively large leader block size and require fairly specific machine and spindle design parameters to allow the leader block to be manipulated, moved, and secured inside the machine. A relatively large leader block results in either a larger cartridge, a larger machine to read from and/or write to the tape, or both.

In another cartridge design, a tape splice is used rather than a leader block. Such a cartridge design is employed by Digital Linear Tape cartridges manufactured by Quantum Corporation. In this design, a piece of stiff and resilient connector tape (e.g., mylar) is secured to the end of the tape within the cartridge. The opposite end of the connector tape is formed to releasably attach to the machine picker, which is also a stiff and resilient piece of connector tape. The piece of connector tape secured to the tape within the cartridge may have a large hole in its free end which is "grabbed" and pulled by a hook in the picker. The tape splice cartridge design addresses the problem inherent in the leader block tape connection design: the relatively large sized and unusually-shaped connection between the tape and the picker. In the connector tape cartridge design, the spliced mylar-to-tape connection may be wound around the machine spindle, with the tape being wound on the machine spindle over the mylar-to-tape connection.

However, the tape splice cartridge design has its own design deficiencies. For example, reliability problems exist in the design of the stiff and resilient connection tape used to connect the picker to the cartridge tape. The connection tape must be stiff enough to resist bending during the connecting procedure (when the machine connects the connection tape to the cartridge tape), but must be flexible enough to easily bend while being wound around a spindle. Therefore, a compromise must be made to either stiffen the connection tape (thereby making winding more difficult and increasing the chance of incorrectly-wound tape) to facilitate easier "picking" or relax the connection tape (thereby making the picking procedure more difficult or unreliable). This compromise can result in a connection or winding which is undesirable. For example, incorrectly-wound tape may lead to tape damage and/or misfeeding of the tape in the cartridge or machine. Also, when a desired connection is not made and the machine attempts to wind the magnetic tape into the machine, the machine can "swallow" the picker (the disconnected connection tape). When the picker is thus "swallowed" into the machine, the machine usually must be serviced to extract the picker from the machine. Conversely, when a desired disconnection procedure fails, attempts to release the cartridge from the machine can cause damage to the tape, the cartridge, and/or the machine. In short, the compromise necessary to provide a connection tape which is both stiff enough to facilitate reliable connections and disconnections while being relaxed enough to be properly wound results in a less-than-optimal design.

The tape splice cartridge design has other undesirable features. For example, when the tape is wound around a spindle, the mylar-to-tape connection may cause the wound tape above the mylar-to-tape connection to be thicker than the other areas along the circumference of the wound tape (creating a "bump" in the wound tape). This bump caused by the mylar-to-tape connection is amplified as more tape is wound on the spindle, and has the undesirable effect of creating a "once around" type of runout on the spindle which can distort a recorded signal on the tape. Another disadvantage of the tape splice cartridge design is the fact that during winding operations, the mylar-to-splice connection passes over the recording head(s) of the machine. This action exposes the recording heads to potential damage and/or excessive wear.

As described above, although designs exist for connecting the tape of a cartridge to the picker of a machine which reads from and/or writes to the tape, each design suffers from significant drawbacks, including inefficient connection size, connection elements which create difficulty in establishing compatibility between cartridges and machines, and connection elements which are not optimally designed for both winding and connecting operations. Therefore, a need exists for a tape-to-machine connection which is space efficient (is as small as possible), affords compatibility with a number of different machines into which a cartridge may be inserted (preferably without major design changes to the machines), and has a simple connection design for dependable connection and disconnection operations. The invention as described herein provides such a tape-to-machine connection.

SUMMARY OF THE INVENTION

A leader pin assembly and a method of making a leader pin assembly are disclosed for use in connecting tape with elements of a machine which manipulate the tape (e.g., move the tape, wind or unwind the tape from a spindle, etc.). In one preferred embodiment of the present invention, the leader pin assembly includes three parts: a leader pin with an elongated barbell shape and with at least one pair of flanges flanking a center section of the leader pin around which the tape is wrapped, an elastomer element which is fitted over the tape wrapped around the center section of the leader pin, and a clip fitted around the elastomer element to secure the elastomer element in a snug position around the tape and leader pin. In another preferred embodiment of the present invention, the elastomer element and the clip are unitary, either constituting one element or being attached to one another. In other preferred embodiments of the present invention, the entire leader pin assembly is molded in place around the tape or the tape is attached to a surface of the leader pin assembly by a bonding material or other fastener.

The flanges and enlarged ends of the leader pin define boundaries for recesses which preferably are used by a picker to latch onto for manipulating the leader pin assembly (e.g., for extracting the leader pin and attached tape from a tape cartridge, for pulling the leader pin and attached tape into a machine which is to read from or write to the tape, etc.). The simple shape of the leader pin assembly permits the size of the assembly to be greatly reduced without greatly increasing the manufacturing cost of the assembly, thereby maximizing space efficiency of equipment (such as tape cartridges and tape drives) which stores and/or manipulates the tape and leader pin assembly. Also, the simple shape of the leader pin assembly results in a generic element and generic interface between tape and equipment which manipulates the tape.

The ends of the leader pin may have an outwardly-curved surface to facilitate smooth movement of the leader pin assembly through equipment which manipulates the leader pin assembly. Also, edges of the leader pin may be beveled to allow equipment (such as a picker which secures itself to the leader pin assembly for pin extraction from a tape cartridge) to more smoothly engage and manipulate the leader pin.

DETAILED DESCRIPTION

Figure 1:
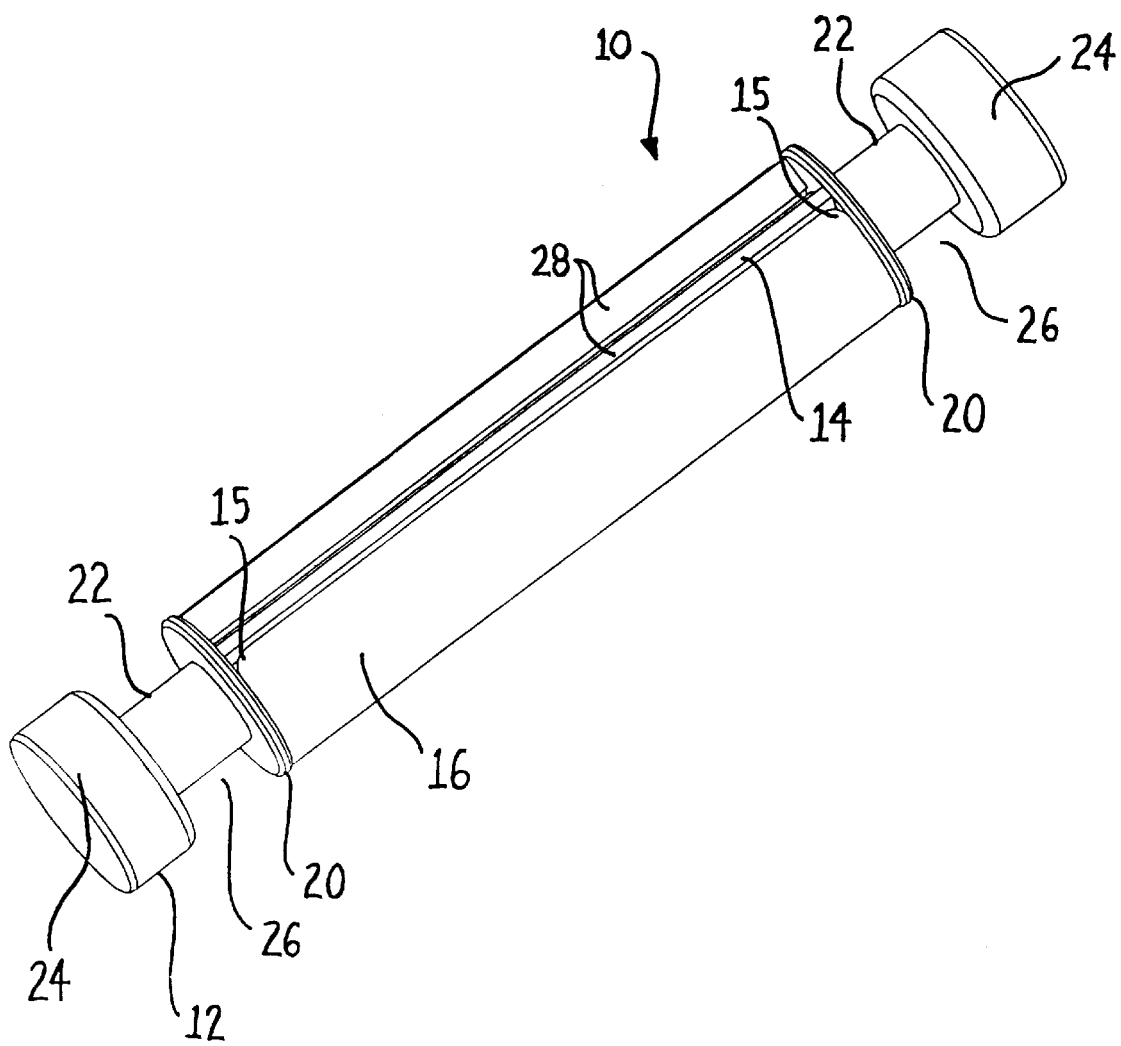
FIG. 1 is a perspective view of a first preferred embodiment of the leader pin assembly of the present invention.
Figure 2:
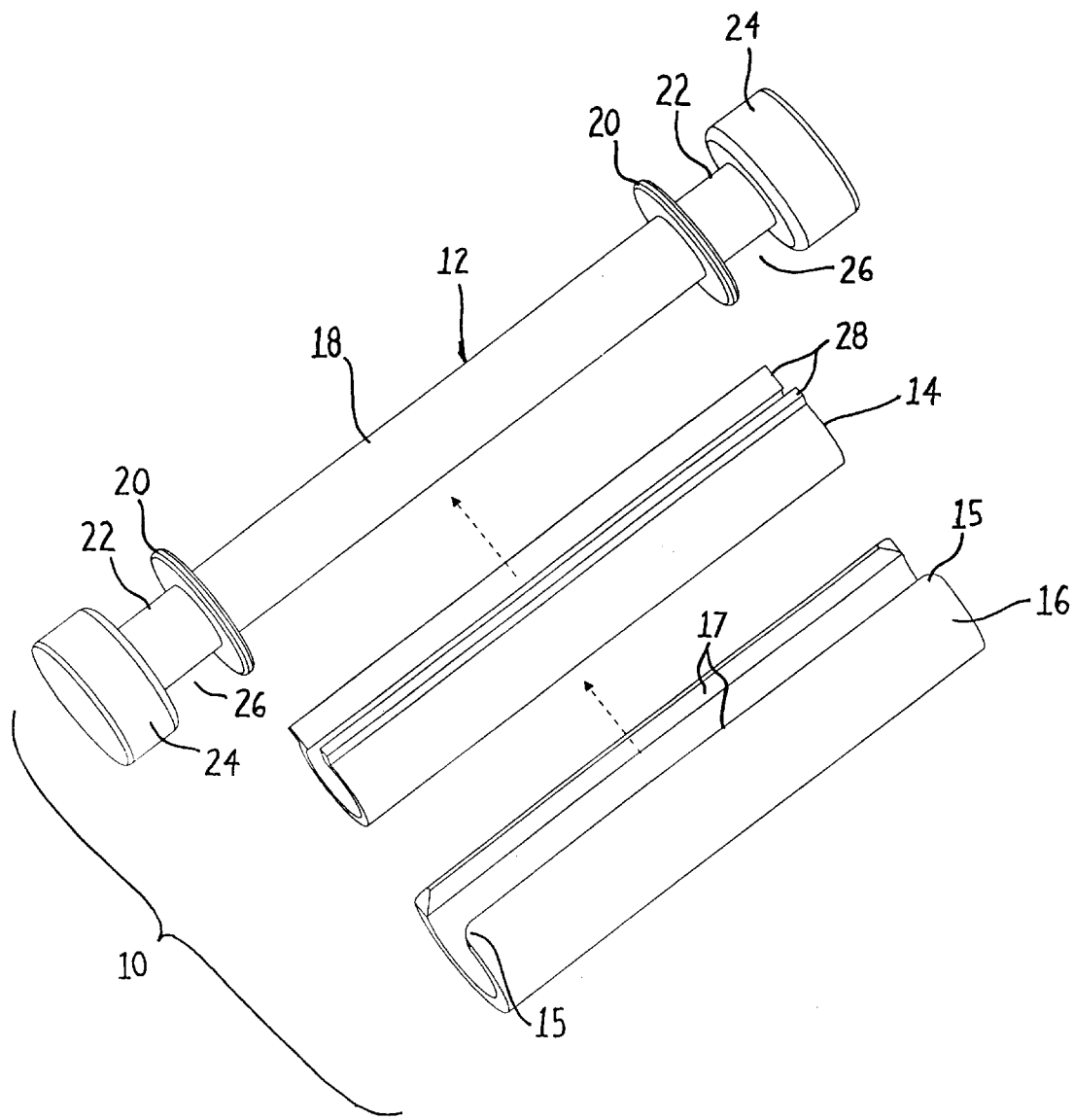
FIG. 2 is an exploded perspective view of the leader pin assembly shown in FIG. 1.
Figure 3:
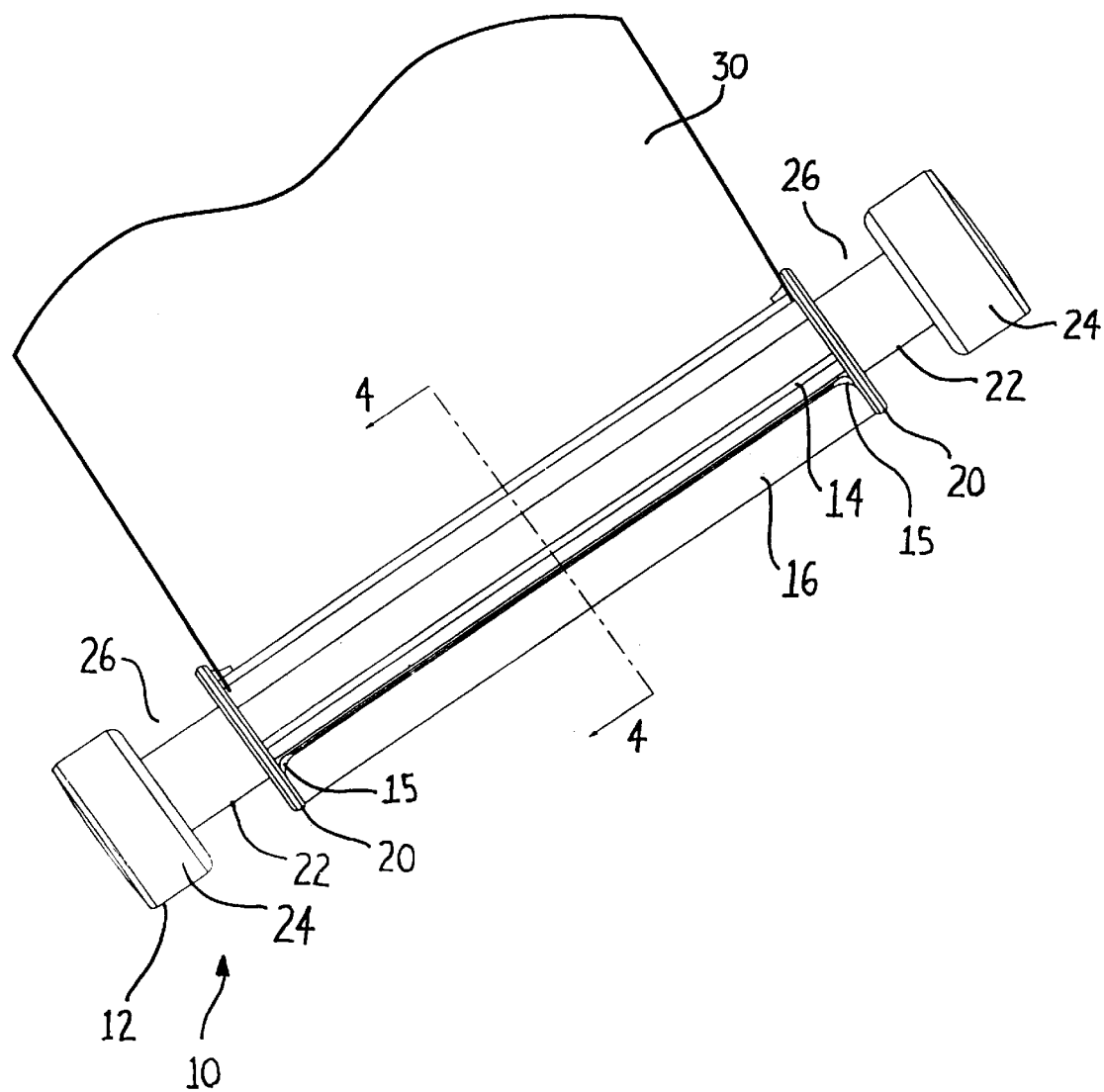
FIG. 3 is a perspective view of the first preferred embodiment of the leader pin assembly of the present invention, with tape installed therein.

FIG. 1 is a perspective view of a preferred embodiment of the leader pin assembly of the present invention, designated generally at 10. Leader pin assembly 10 in this preferred embodiment includes three main elements: leader pin 12, elastomer element 14, and C-clip 16. As can also be seen in FIG. 2, which is an exploded perspective view of leader pin assembly 10, leader pin 12 preferably has a barbell shape. Leader pin 12 has an elongated center section 18, a pair of flanges 20 located a distance from the ends of leader pin 12, and preferably has sections 22 extending beyond flanges 20. Sections 22 preferably have the same diameter as center section 18. Each section 22 preferably terminates with an end 24 having the same diameter as flanges 20. Flanges 20, leader pin sections 22, and ends 24 define recesses 26 of leader pin 12. Surrounding elongated center section 18 and located between flanges 20 of leader pin 12 is elastomer element 14. Elastomer element 14 is preferably horseshoe shaped in cross section, with elastomer flanges 28 extending from the ends of elastomer element 14. Elastomer element 14 is held in place around center section 18 and between flanges 20 of leader pin 12 by C-shaped clip 16, which is itself located between flanges 20 of leader pin 12. As shown in FIG. 3, the end of a tape 30 is attached to leader pin assembly 10 by being squeezed between center section 18 of leader pin 12 and elastomer element 14 (which itself is firmly clamped in placed by clip 16). To insure a snug fit and a firm connection of the tape 30 to leader pin assembly 10, elastomer element 14 is sized such that when it is installed in place around tape 30 and center section 18 of leader pin 12, outer diameter 32 of elastomer element 14 is slightly larger than inner diameter 34 of clip 16.

To attach a tape 30 to leader pin assembly 10 as shown in FIG. 3, the end of tape 30 is wrapped around center section 18 of leader pin 12. Next, elastomer element 14 is placed around tape 30 and center section 18 of leader pin 12. Finally, clip 16 is snapped in place over elastomer element 14 and tape 30. In this regard, and with reference to the possible material types of clip 16 described below, it should be noted that clip 16 may be made of a number of materials having variable flexibility. Therefore, when clip 16 is forced over elastomer element 14, a stiff clip material will require most or all flexibility to reside in elastomer element 14 as clip 16 is squeezed into place over elastomer element 14. In other words, elastomer element 14 will deform as clip 16 is inserted thereover. Similarly, a flexible clip material can be selected to permit clip 16 to flex along with elastomer element as clip 16 is squeezed into place over elastomer element. In this regard, due to the flexible nature of elastomer element 14, when installed on leader pin 12, elastomer element 14 may become non-concentric with respect to the other elements of leader pin assembly 10. Therefore, in order to compensate for any non-concentricity of elastomer element 14, material may be removed from a rear area of elastomer element 14 (i.e., on the area of elastomer element 14 opposite the opening of clip 16). To enable smoother insertion of clip 16 over elastomer element 14, edges and/or corners of clip 16 may be beveled or rounded. For example, comers 15 of clip 16 are preferably rounded as best shown in FIG. 2. Also for example, edges 17 of clip 16 are preferably beveled as best shown in FIG. 2.

Figure 4:
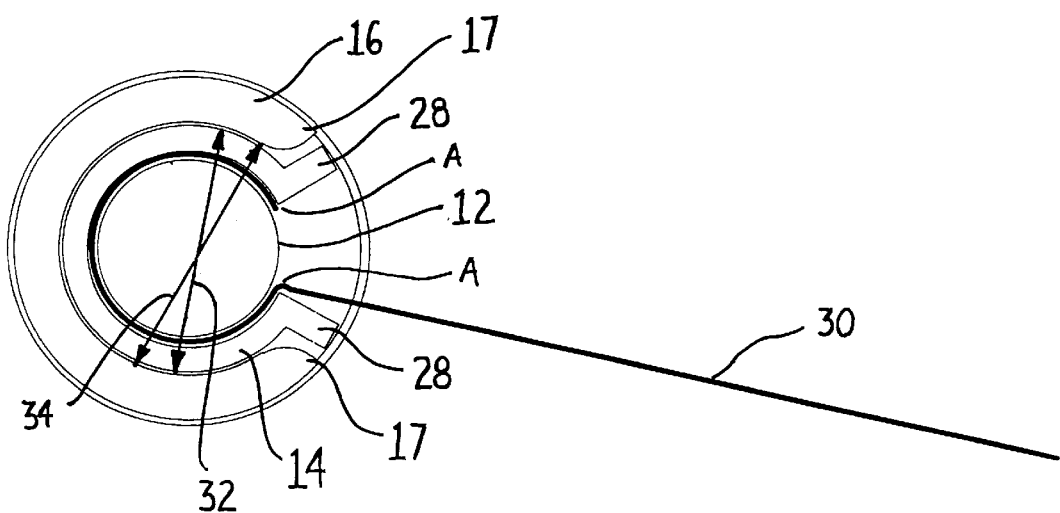
FIG. 4 is a cross-sectional view of the leader pin assembly of FIG. 3 taken along line 4—4 in FIG. 3.

FIG. 4 is a cross-sectional view of leader pin assembly 10 taken along line 4—4 in FIG. 3. As can be seen in FIG. 4, elastomer flanges 28 of elastomer element 14 act to prevent tape 30 from coming into contact with the edges 17 of clip 16. Such contact might damage tape 30 if clip edges 17 are sharp or if tape 30 repeatedly contacts or rubs against clip edges 17 during winding operations. In the preferred embodiment of the present invention as best shown in FIG. 4, tape 30 is gripped uniformly throughout the length of the tape located between center section 18 of leader pin 12 and elastomer element 14. This gripping method prevents excessive pressure on a small area of tape 30 (such as, for example, at points A in FIG. 4), which may cause tape 30 to break. Although a uniform grip is preferred, other grip types are possible. For example, clip 16 may be shaped such that grip force is exerted by clip 16 primarily on particular areas of tape 30 (such as at points A in FIG. 4).

An important result of the above-described arrangement of clip 16 compressing elastomer element 14 against tape 30 is that tape 30 is pressed against a flexible material (i.e., elastomer element 14). Such an arrangement acts to relieve strain on the section of tape installed in leader pin assembly 10 and also provides for better and more distributed frictional gripping of the tape in leader pin assembly 10 (which itself serves to relieve strain on the section of tape installed in leader pin assembly 10).

Leader pin 12, elastomer element 14, and clip 16 may each be made from a number of materials well-known to those skilled in the art. For example, leader pin 12 and clip 16 are preferably made from steel, but other metals may also be used, as well as other materials such as plastics, composites, ceramics, etc. Elastomer element 14 is preferably made of elastomeric material (such as rubber, urethane, or engineered elastomer such as the engineered elastomer sold under the trademark Santoprene, which trademark is owned by Advanced Elastomer Systems, L.P.).

Leader pin 12 and clip 16 may both be made in a number of ways well-known in the art. For example, leader pin 12 and clip 16 may be lathed, injection molded, pressed into form (e.g., sintered material), cast, forged, or extruded and post-machined, etc. Similarly, elastomer element 14 may be milled, injection molded, pressed into form, extruded, etc.

Figure 5:
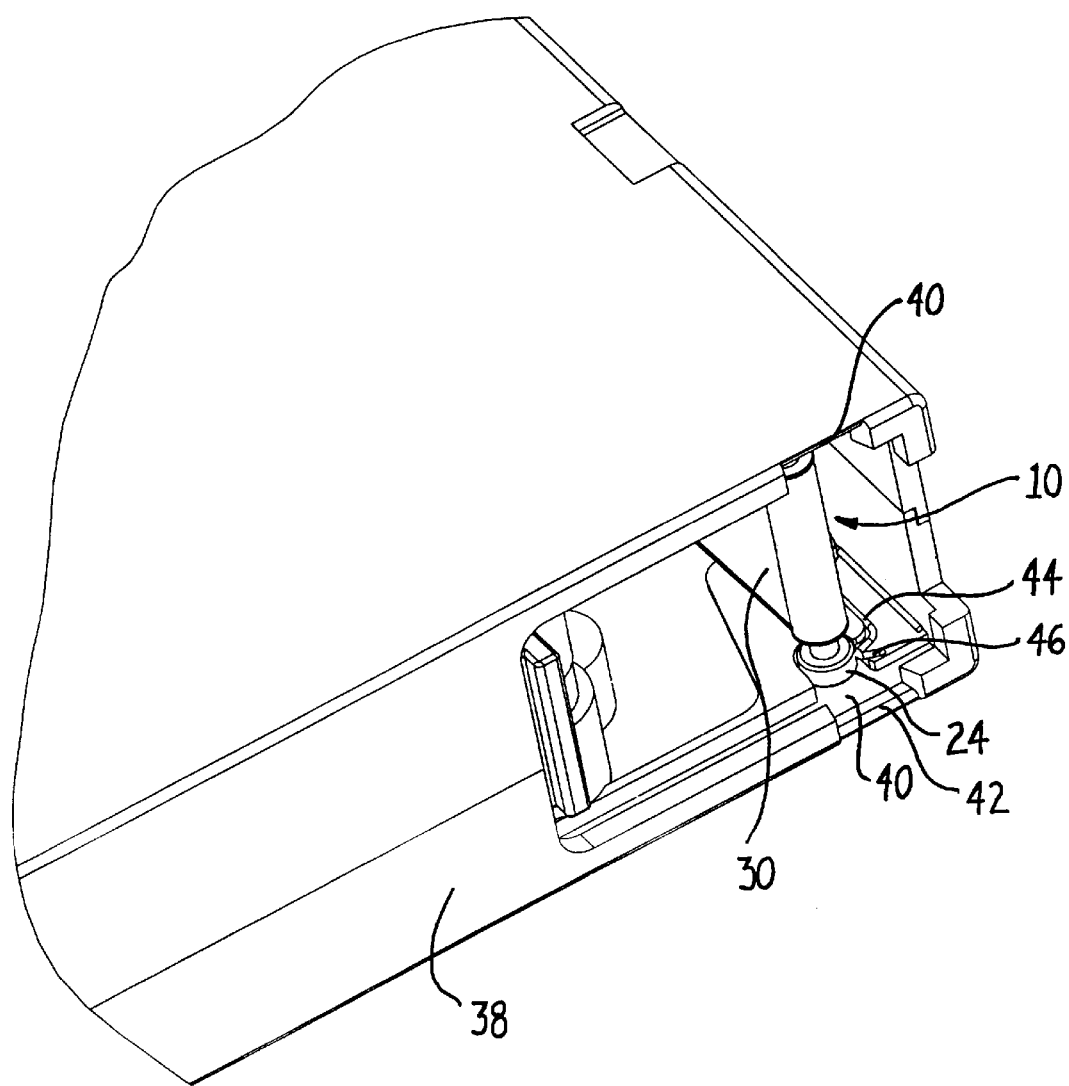
FIG. 5 is a perspective view of the first preferred embodiment of the leader pin assembly of the present invention shown fully installed within a tape cartridge.

In order to fully describe other features of the leader pin assembly 10 of the present invention, it is necessary to show and describe how leader pin assembly 10 may be fitted with respect to a cartridge. In this regard, it should be noted that leader pin assembly 10 is designed so that it may be used in a large number of cartridge types, one of which is shown only by way of example in FIG. 5. Cartridge 38 in FIG. 5 houses leader pin assembly 10 in a pair of grooves 40. Grooves 40 extend from an interior position inside of cartridge 38 to the exterior of cartridge 38. As can be seen in FIG. 5, tape 30 stored in cartridge 38 is secured to leader pin assembly 10 in a manner as described above. Leader pin assembly 10 is shown in a secured position at the interior end of grooves 40 within cartridge 38. Each end 24 of leader pin assembly 10 fits into a respective groove 40. When a picker of a machine (not shown) extracts leader pin assembly 10 from cartridge 38, leader pin assembly 10 is pulled along grooves 40 (with ends 24 following in their respective grooves 40) out of cartridge 38 and into the machine. When tape 30 is wound back into cartridge 38, ends 24 of leader pin assembly 10 enter cartridge 38 via grooves 40 which guide leader pin assembly 10 back into the fully retracted position shown in FIG. 5. The mouth 42 of each groove 40 may be beveled to permit easier entry of leader pin assembly ends 24 into grooves 40.

When leader pin assembly 10 is in the fully retracted position within cartridge 38 as shown in FIG. 5, it is desirable to secure leader pin assembly 10 against unintentional movement during cartridge handling, storage, etc. Therefore, spring 44 secured within cartridge 38 has an arm 46 which is biased against leader pin assembly 10. Arm 46 of spring 44 is angled to permit entry and exit of leader pin assembly 10 to and from its fully contracted position only when the force exerted to extract or insert pin assembly 10 reaches a predetermined level. Such a force is exerted, for example, by rewinding tape 30 into cartridge 38 or by a picker (not shown) pulling leader pin assembly 10 from its fully contracted position.

Having now described the relationship of leader pin assembly 10 with respect to one example cartridge, additional features of leader pin assembly 10 will now be described. It should be noted, however, that leader pin assembly 10 may be mounted and secured within cartridge

38 in any number of different manners. For example, leader pin assembly 10 need not necessarily be guided into and out of a cartridge by grooves 40, nor is the spring 44 shown in FIG. 5 the only way to secure leader pin assembly 10 in its fully retracted position. The various manners by which leader pin assembly 10 may be guided into, guided out of, and secured in position within a cartridge is beyond the scope of the present invention. However, as described more fully below, features and elements of leader pin assembly 10 which facilitate extraction and replacement of leader pin assembly 10 and tape 30 in cartridge 38 are considered to be part of and within the scope of the present invention.

Figure 6:
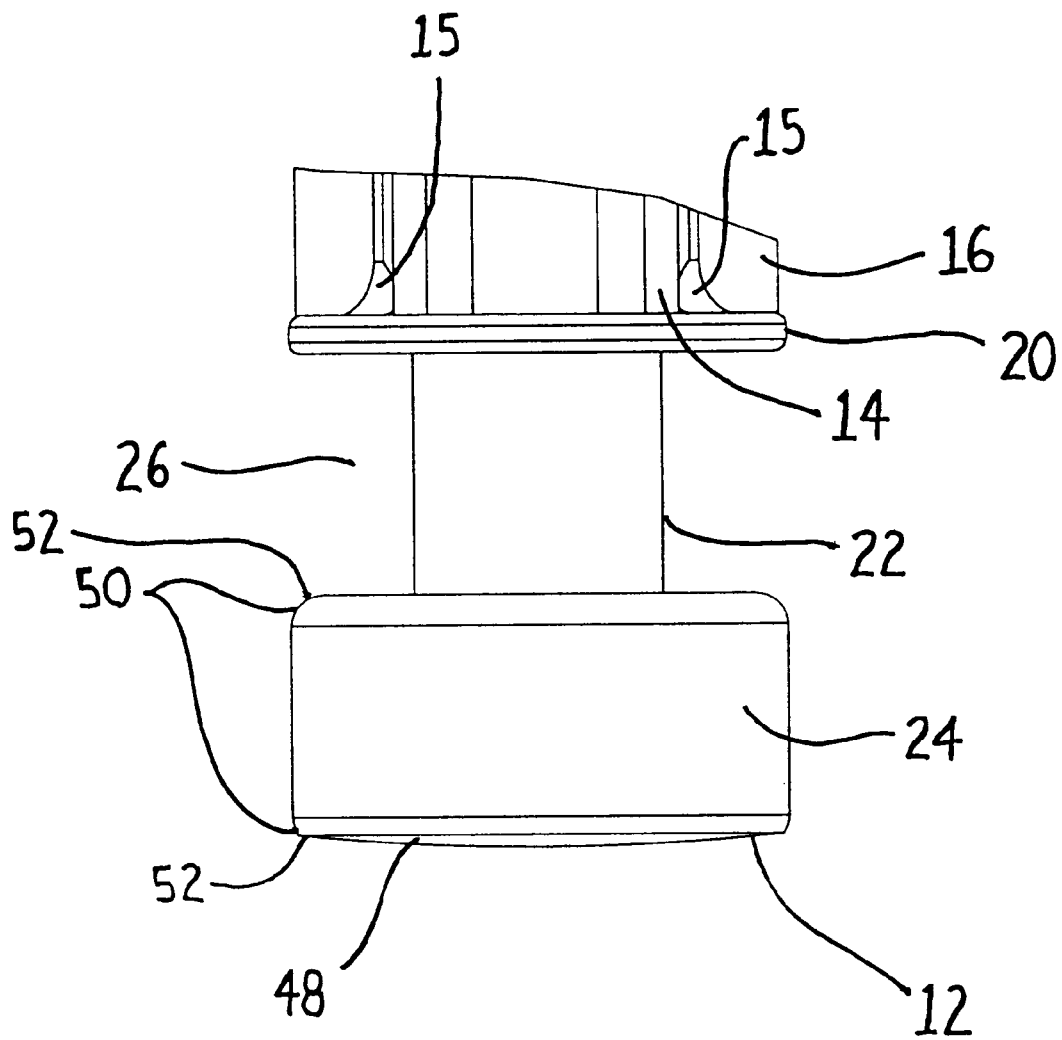
FIG. 6 is a closeup elevational view of one end of the leader pin assembly shown in FIG. 3.

FIG. 6 is a close-up view of one end of leader pin assembly 10 without tape 30 installed therein. It can be seen from FIG. 6 that the terminal face 48 of end 24 is bowed outward. With reference also to FIG. 5, the bowed face of ends 24 enable leader pin assembly 10 to more easily move across surfaces within cartridge 38 (such as grooves 40 of cartridge 38) and, where necessary, within the machine (not shown) which draws tape 30 and leader pin assembly 10 out of cartridge 38. The radius of the terminal face 48 of ends 24 may vary, but is preferably no greater than the length of leader pin assembly 10.

Figure 7:
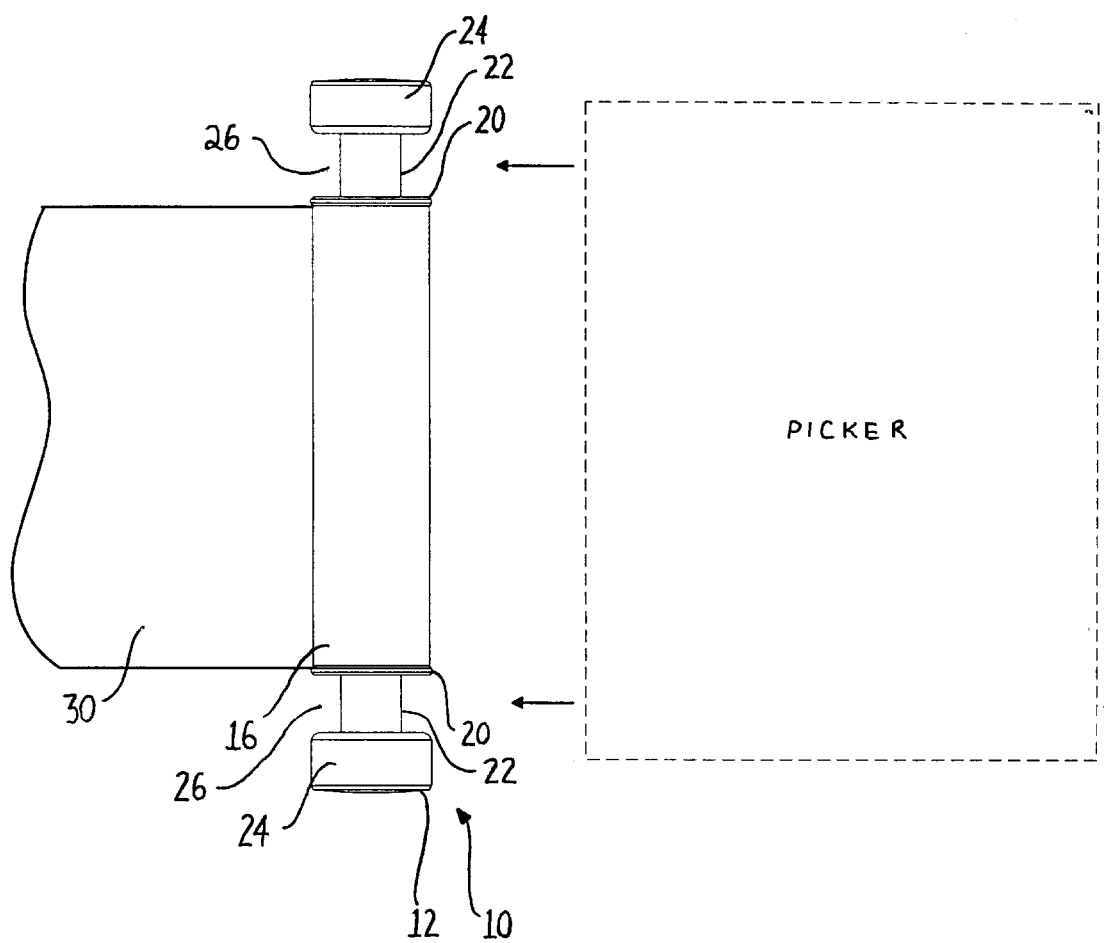
FIG. 7 is an elevational view of the leader pin assembly shown in FIG. 3, further showing the relationship between the leader pin assembly and a picker.

As shown in FIG. 7 and as described above, leader pin assembly 10 is captured by a picker of a machine into which the leader pin assembly and attached tape is to be drawn. Since there are several ways to extract leader pin assembly 10 from cartridge 38 (each depending greatly upon the shape of leader pin assembly 10 described above), a number of different picker types are possible and are known in the art. For example, a picker having hooks or similar elements may be latched via such hooks to recesses 26 of leader pin 12. While use of recesses 26 in leader pin assembly 10 is a preferred manner of securing leader pin assembly 10 to a picker, other securement alternatives are possible, such as a picker which grips elongated center section 18 of leader pin assembly 10, or a picker which latches around ends 24 of leader pin assembly 10. The simple barbell shape of leader pin assembly 10 (with recesses 26) provides a relatively generic attachment means onto which a number of different pickers may be secured in a number of different manners.

Also shown in FIG. 6 are radii 50 on ends 24 of leader pin assembly 10. Radii 50 are located on edges 52 of ends 24, and help to avoid the possibility of sharp corners of leader pin 12 scoring or catching on cartridge 38 or in the interior of a machine into which leader pin assembly 10 is drawn. Radii 50 also help to guide a picker (not shown) into place during leader pin assembly extraction from cartridge 38.

In a second preferred embodiment of the present invention, clip 16 and elastomer element 14 are a one-piece unit. Though this embodiment does not necessarily differ in appearance from the first preferred embodiment discussed above and shown in the figures (see in particular FIGS. 1, 3, and 4), such a leader pin assembly offers faster assembly and disassembly around tape 30. It should be noted that such a one-piece clip and elastomer element unit may be made entirely from one material. This material (e.g., rubber, urethane, engineered plastic, etc.) would necessarily offer enough flexibility to flex over leader pin 12 during installation and enough stiffness to suitably lock in place over leader pin 12.

Figure 8:
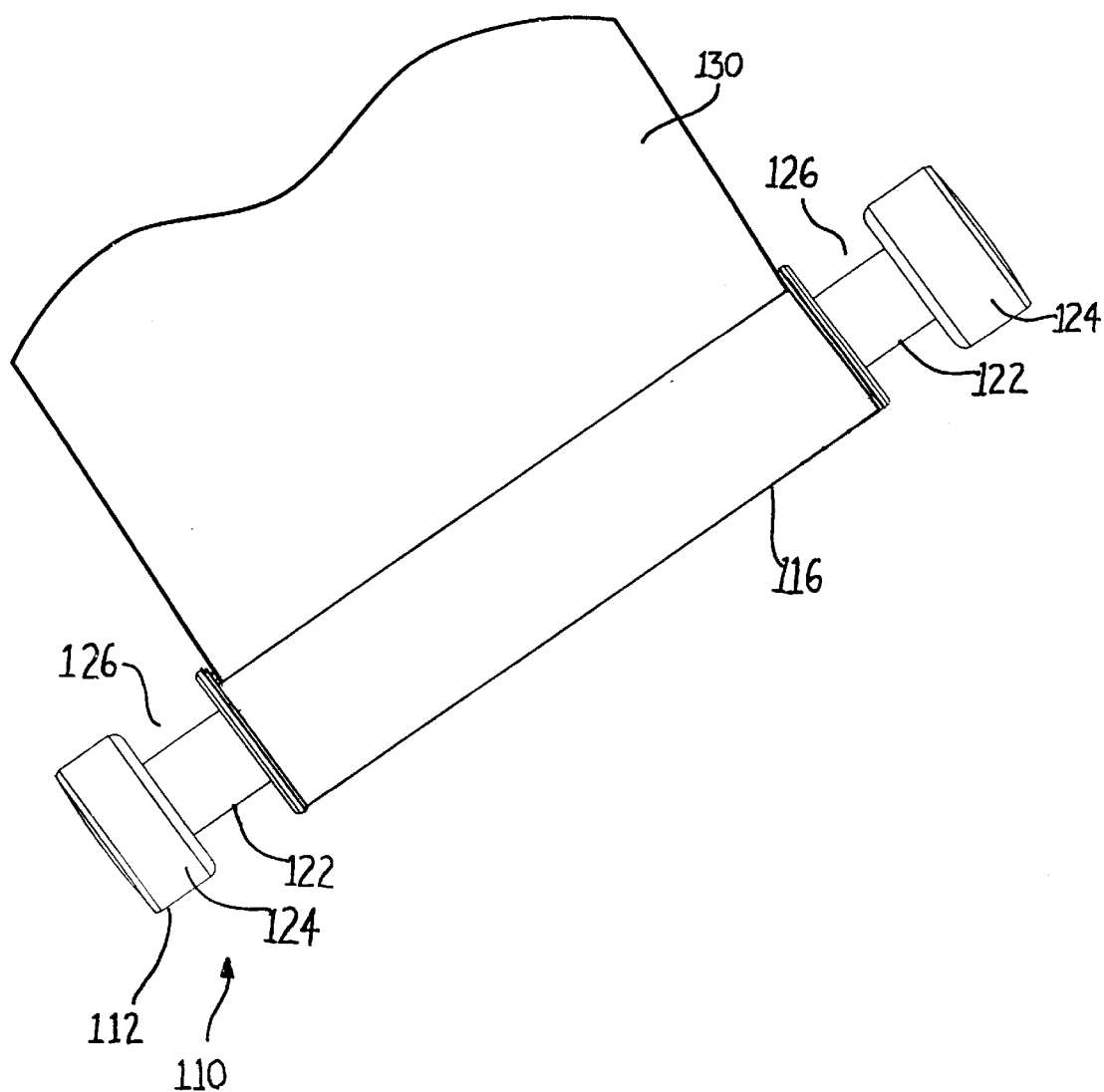
FIG. 8 is a perspective view of a third preferred embodiment of the leader pin assembly of the present invention, with tape installed therein.

A third preferred embodiment of the present invention is illustrated in FIG. 8. In this embodiment, leader pin assembly 110 is a one-piece element molded, formed or attached around tape 130. For example, assembly 110 may be injection molded, cast, pressed, etc. around tape 130. Preferably, leader pin assembly 110 has recesses 126, sections 122, and ends 124 similar to the leader pin assemblies of the first and second preferred embodiments discussed above, although the possible variations in the leader pin assembly shape and configuration discussed with respect to the first preferred embodiment above apply to leader pin assembly 110 as well. As also described above with respect to the first preferred embodiment, leader pin assembly 110 may be made from a number of materials such as metal, plastic, composites, ceramics, etc.

Figure 9:
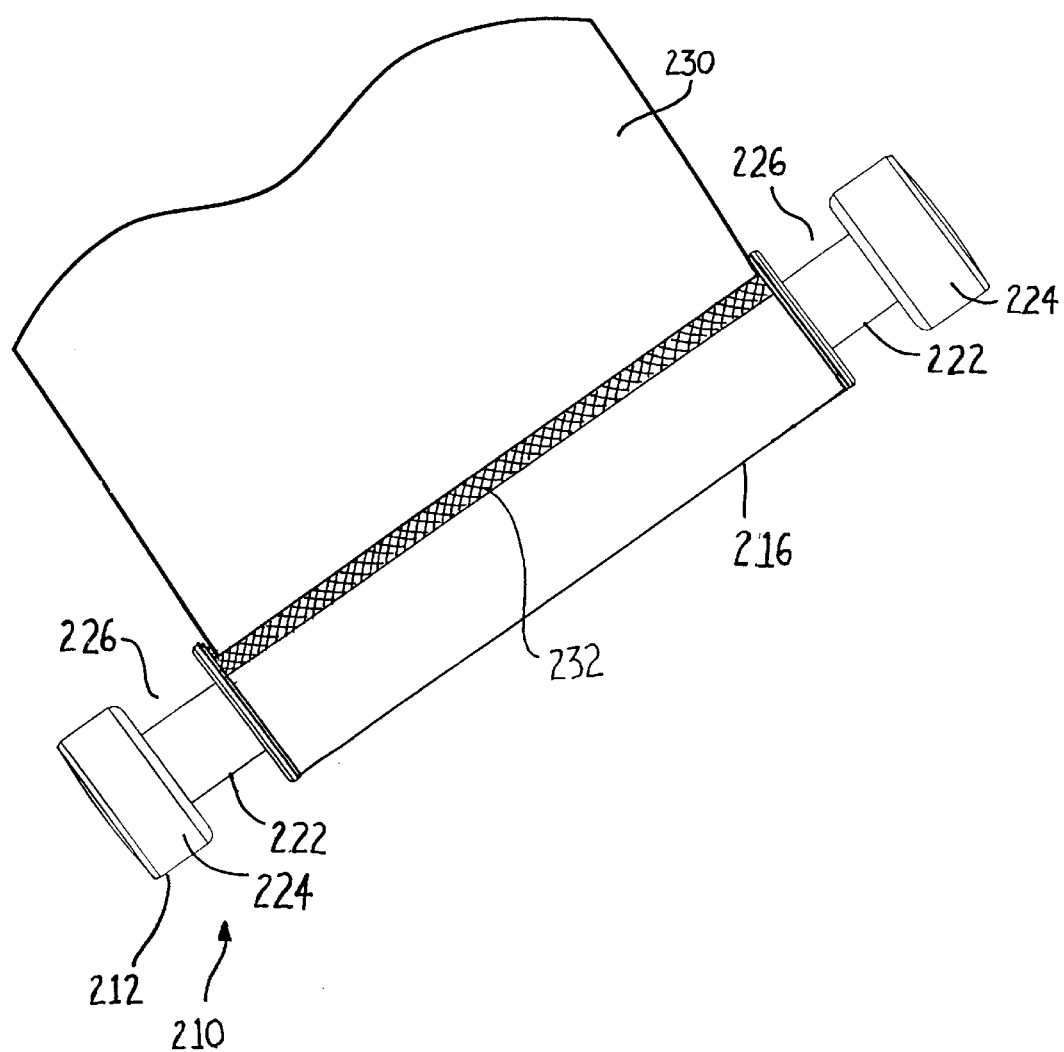
FIG. 9 is a perspective view of a fourth preferred embodiment of the leader pin assembly of the present invention, with tape installed thereon.

A fourth preferred embodiment of the present invention illustrated in FIG. 9 is similar to the one-piece design described above with respect to leader pin assembly 110. In this embodiment, leader pin assembly 220 is preferably a one-piece element having the same shape as leader pin assemblies of the first, second and third preferred embodiments. However, rather than forming, molding, or attaching leader pin assembly 220 around tape 230 (as with leader pin assembly 110), tape 230 is preferably attached to a surface of leader pin assembly 220 via an adhesive or cohesive bonding material 232, by being melted to leader pin assembly, or by being affixed to a surface of leader pin assembly in any number of conventional manners (such as by staples, rivets, other fasteners, etc.). Leader pin assembly 220 provides the simplest leader pin assembly design of the four preferred embodiments discussed. Preferably, leader pin assembly 210 has recesses 226, sections 222, and ends 224 similar to the leader pin assemblies of the first, second, and third preferred embodiments discussed above, although the possible variations in the leader pin assembly shape and configuration discussed with respect to the first preferred embodiment above apply to leader pin assembly 210 as well. As also described above with respect to the first preferred embodiment, leader pin assembly 210 may be made from a number of materials such as metal, plastic, composites, ceramics, etc.

It will be appreciated that various changes in the details, materials and arrangement of parts which have been herein described and illustrated in order to explain the nature of the present invention may be made by those skilled in the art within the principle and scope of the invention as expressed in the following claims. For example, in the embodiments described and illustrated herein, the cross-sectional shape of leader pin 12 and clip 16 are generally round. Other cross-sectional shapes (e.g., square, oval, etc.) for these elements are possible. Also, elastomer element 14 is described and shown as having a horseshoe shaped cross-section. As with leader pin 12 and clip 16, other cross-sectional shapes are possible, and preferably match the cross-sectional shape of leader pin 12 and clip 16. Elastomer element 14 may even be flat in shape when not installed around leader pin 12 and tape 30, and may be wrapped around leader pin 12 and tape 30 to assume a round shape when so installed. It will also be appreciated by one having ordinary skill in the art that various permutations in the shape, number, and relationship of leader pin assembly elements are possible (i.e., though one, two, and three-piece leader pin assemblies having concentric elements are described above, other leader pin assembly configurations performing the same functions are possible). Also, though the preferred embodiment of leader pin 12 has ends 24 extending therefrom which have the same diameter as flanges 20, (such ends being useful for running in grooves 40 of a cartridge 38 and/or for providing elements which may be used to manipulate leader pin assembly 10), leader pin 12 may not have ends 24 at all. The inclusion of ends 24 and their particular shape is largely dictated by the cartridge design and the picker which grasps leader pin assembly 10. As yet another example of the various changes in the details, materials, and arrangement of parts which are considered to fall within the scope of the present invention, it should be noted that in the embodiments described and illustrated, only two flanges 20 defining two recesses 26 are shown in leader pin 12 (to which a picker may attach itself to). More flanges defining more recesses are possible along the length of leader pin 12, thereby varying the possible location and manner by which a picker may grasp leader pin assembly 10. Finally, it should be noted that although the present invention has been described with reference to use with magnetic tape in computer and information systems, the present invention is equally applicable to any other system in which any type of tape is wound about one or more spindles (for example, systems which wind camera film or other non-magnetic film, audio and video tape systems manipulating tape media, etc.).

What is claimed is:

1. A leader pin assembly for attachment to tape comprising:
   a leader pin, the leader pin including at least one flange located a distance from an end of the leader pin;
   a flexible element covering at least a part of the leader pin; and
   a clip securing the flexible element to the leader pin.

2. The leader pin assembly as claimed in claim 1, wherein the flexible element and the clip form an integral one-piece element.

3. The leader pin assembly as claimed in claim 1, wherein the leader pin has at least one enlarged end.

4. The leader pin assembly as claimed in claim 1, further comprising tape connected to the leader pin assembly and a housing for enclosing the tape and leader pin assembly.

5. The leader pin assembly as claimed in claim 4, further comprising a picker device for engaging the leader pin assembly.

6. The leader pin assembly as claimed in claim 1, wherein the clip is a C-shaped member having an interior diameter sized to clamp the flexible element over the leader pin.

7. The leader pin assembly as claimed in claim 1, wherein the leader pin has at least one end having a convexly curved outer face.

8. The leader pin assembly as claimed in claim 1, wherein the flexible element substantially surrounds a center section of the leader pin.

9. The leader pin assembly as claimed in claim 8, wherein the flexible element includes at least one edge which extends beyond the clip when the clip is secured over the flexible element.

10. The leader pin assembly as claimed in claim 1, wherein the leader pin assembly is adapted to securably receive the tape between the leader pin and the flexible element.

11. A leader pin assembly for attachment to tape comprising:
    a leader pin, the leader pin having at least one enlarged end and at least one flange located a distance from the at least one enlarged end to define a recess between the at least one enlarged end and the at least one flange;
    a flexible element covering at least a part of the leader pin; and
    a clip securing the flexible element to the leader pin.

12. The leader pin assembly as claimed in claim 11, wherein the leader pin has a first end and a second end, the first end and the second end both being enlarged.

13. The leader pin assembly as claimed in claim 11, further comprising tape connected to the leader pin assembly and a housing for enclosing the tape and leader pin assembly.

14. The leader pin assembly as claimed in claim 13, further comprising a picker device for engaging the leader pin assembly.

15. A leader pin assembly for attachment to tape comprising:
    a leader pin, the leader pin having a first end and a second end, the first end and the second end both being enlarged, and at least two flanges, each flange located a distance from each enlarged end to define a recess between each enlarged end and a corresponding flange and a center section between said at least two flanges;
    a flexible element covering at least a part of the leader pin; and
    a clip securing the flexible element to the leader pin.

16. The leader pin assembly as claimed in claim 15, further comprising tape connected to the leader pin assembly and a housing for enclosing the tape and leader pin assembly.

17. The leader pin assembly as claimed in claim 16, further comprising a picker device for engaging the leader pin assembly.

18. The leader pin assembly as claimed in claim 15, wherein the flexible element is located on the center section of the leader pin.

19. The leader pin assembly as claimed in claim 18, wherein the flexible element substantially surrounds the center section of the leader pin.

20. The leader pin assembly as claimed in claim 19, wherein the flexible element includes at least one edge which extends beyond the clip when the clip is secured over the flexible element.

21. The leader pin assembly as claimed in claim 15, wherein the clip is a C-shaped member having an interior diameter sized to clamp the flexible element over the leader pin.

22. The leader pin assembly as claimed in claim 21, wherein the flexible element is made of an elastomer material.

23. The leader pin assembly as claimed in claim 15, wherein the first end and the second end of the leader pin each has an outer face which is convexly curved.

24. The leader pin assembly as claimed in claim 23, wherein each enlarged end has a radiused edge.

25. The leader pin assembly as claimed in claim 15, wherein each enlarged end has a radiused edge.

26. The leader pin assembly as claimed in claim 15, wherein the flexible element is made of an elastomer material.

27. The leader pin assembly as claimed in claim 15, wherein the leader pin assembly is adapted to receive the tape between the leader pin and the flexible element.

28. A method of making a leader pin assembly for attachment to tape, comprising the steps of:
    providing a leader pin, the leader pin having at least one enlarged end and at least one flange located a distance from the at least one enlarged end to define a recess in the leader pin;
    providing a clip: securing a flexible element to the leading pin with the clip and securing the tape between the leader pin and the flexible element.

29. The method as claimed in claim 28, wherein the leader pin has
    a first enlarged end;
    a second enlarged end opposite the first enlarged end;
    a first flange located a distance from the first enlarged end to define a first recess located between the first enlarged end and the first flange;

a second flange located a distance from the second enlarged end to define a second recess located between the second enlarged end and the second flange; and a center section defined by an area between the first flange and the second flange.

30. The method as claimed in claim 29, wherein the flexible element substantially surrounds the center section of the leader pin.

31. The method as claimed in claim 30, wherein the flexible element has at least one edge which extends beyond the clip.

32. The method as claimed in claim 31, wherein the clip is a C-shaped member having an interior diameter sized to clamp the flexible element over the leader pin.

33. The method of making a leader pin assembly as claimed in claim 28, further comprising the step of providing a housing for enclosing the tape and leader pin assembly.

34. The method of making a leader pin assembly as claimed in claim 33, further comprising the step of engaging the leader pin assembly with a picker device.

* * * * *